Figure 1:
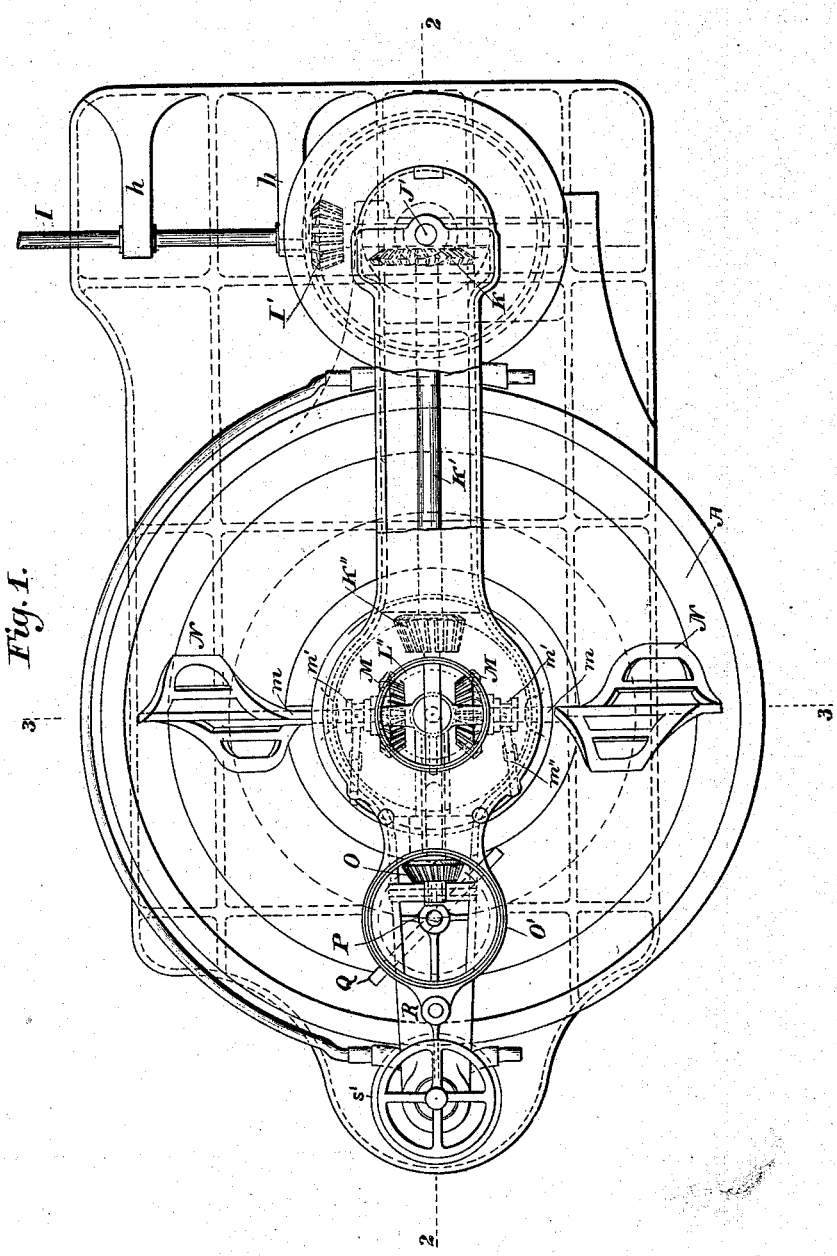

(No Model.) 5 Sheets—Sheet 1.

L. DURAND.
DOUGH KNEADER.

No. 326,023. Patented Sept. 8, 1885.

Witnesses:
J. Henry Kaiser.
Geo. T. Smallwood.

Inventor:
Louis Durand
By Knight Bros.
Attys

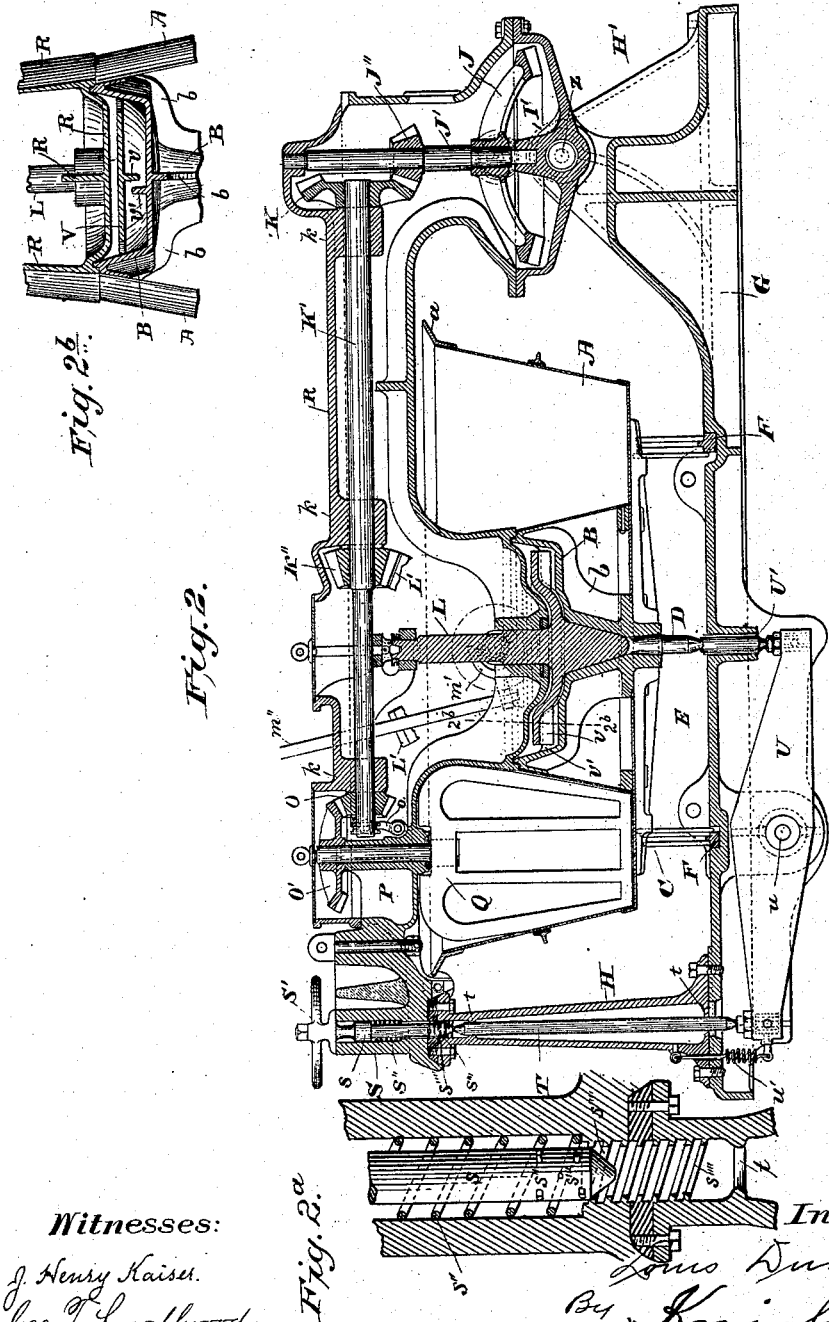

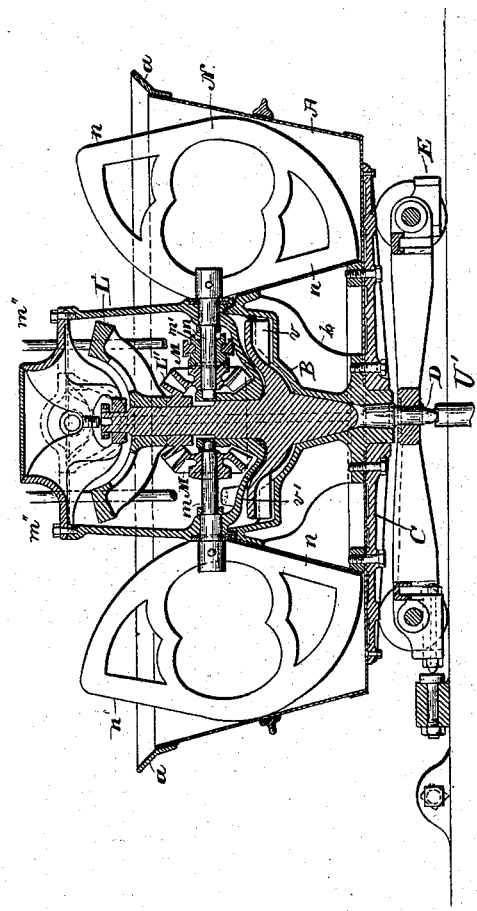

(No Model.) 5 Sheets—Sheet 4.
L. DURAND.
DOUGH KNEADER.
No. 326,023. Patented Sept. 8, 1885.
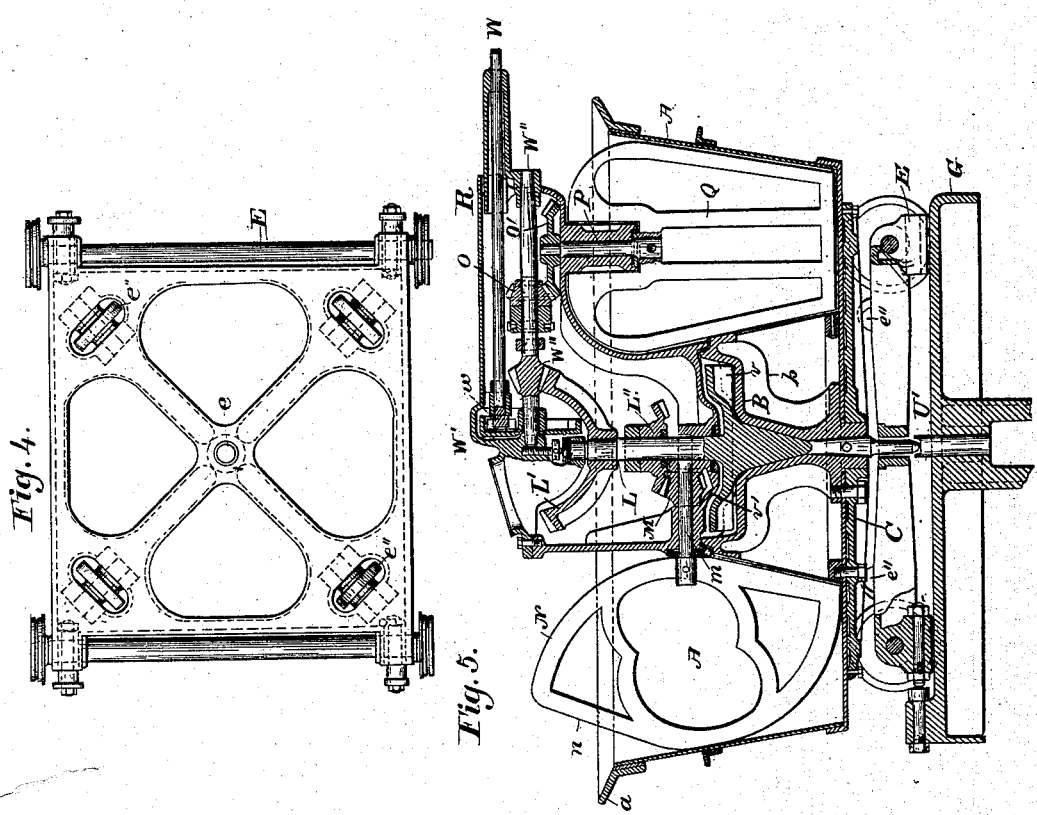
Witnesses:
J. Henry Kaiser.
Geo. T. Smallwood.
Inventor:
Louis Durand
By Knight Bro.
Attys

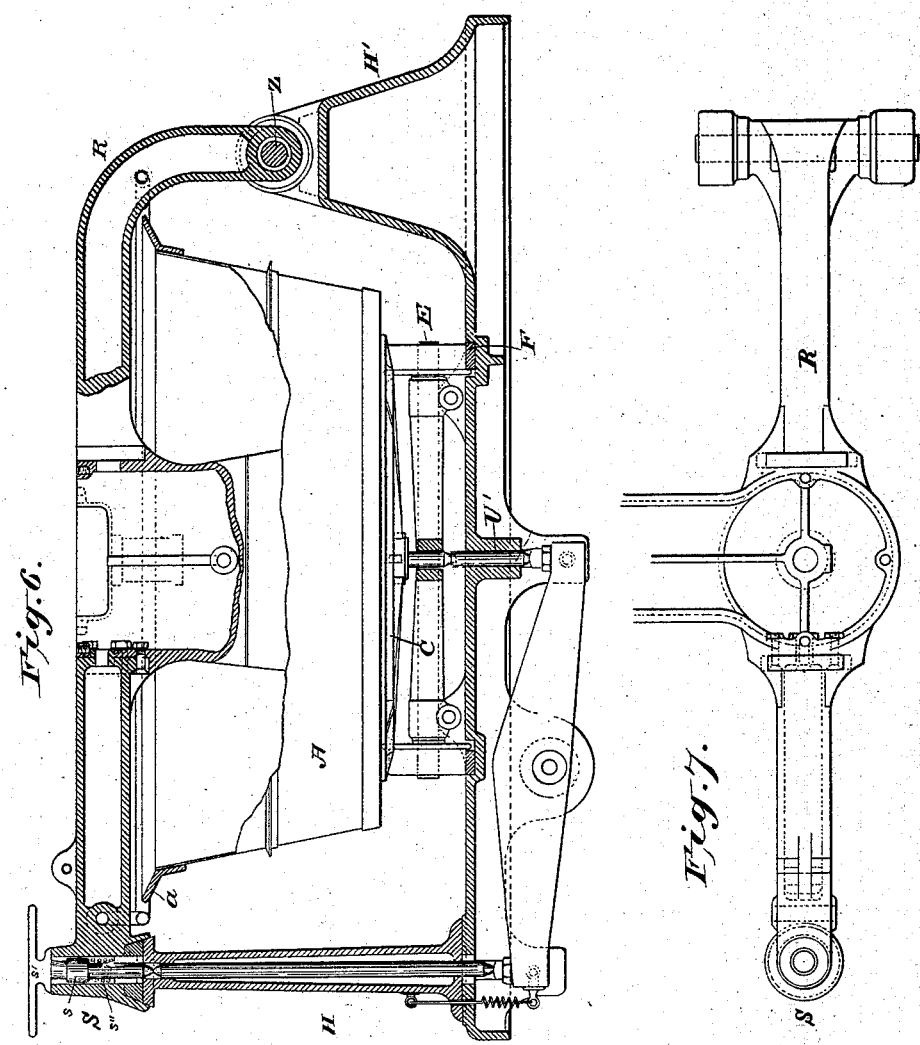

UNITED STATES PATENT OFFICE.

LOUIS DURAND, OF TICONDEROGA, NEW YORK.

DOUGH-KNEADER.

SPECIFICATION forming part of Letters Patent No. 326,023, dated September 8, 1885.

Application filed August 24, 1883. (No model.)

*To all whom it may concern:*

Be it known that I, LOUIS DURAND, a citizen of the United States, residing at Ticonderoga, in the county of Essex and State of New York, have invented certain new and useful Improvements in Dough-Kneaders, of which the following is a specification.

My invention relates to that class of dough-kneaders which are provided with beaters and stirrers rotating on separate axes, and in which the pan for holding the breadstuffs to be operated on is revolved, whereby the beaters and stirrers are brought successively to act upon the same material, thus producing in effect very much the same result as when the dough is manipulated by hand, and at the same time economizing time and labor to a very great extent.

My present invention consists, first, in so arranging the driving mechanism above the kneading or bread pan that the said mechanism may be lifted or thrown back, thereby exposing the pan and its contents, and permitting its removal, as hereinafter more fully described.

My invention also consists in placing the pan upon a truck, by which means the dough may be easily conveyed from one place to another before and after the kneading operation. These trucks or cars move upon tracks provided for them, and the driving or operating mechanism is built on both sides of these tracks.

My invention further consists in means, which I shall hereinafter describe in detail, for locking the apparatus when the kneading-pan is wheeled into position, and by the same movement elevating the pan and throwing it into connection with the operating mechanism, whereby it is at once freed from the truck, placed upon a central pivotal bearing, and connected directly to the driving-shaft.

In the accompanying drawings, which form a part of this specification, Figure 1 represents a plan view of my improved dough-kneader. Fig. 2 is a longitudinal section of the same on the line 2 2, Fig. 1. Fig. 2ª is an enlarged detail view of the locking mechanism. Fig. 2ᵇ is a detail sectional elevation on the line 2ᵇ 2ᵇ, Fig. 2, showing the mechanism for connecting the pan with its rotary shaft. Fig. 3 is a transverse section of the device on the line 3 3, Fig. 1. Fig. 4 represents a plan view of the truck for moving the kneading-pan from place to place. Fig. 5 represents a sectional view of a modified form of my device, and is more especially suitable where a smaller apparatus is desired and where hand-power is employed. Fig. 6 is a longitudinal elevation, partly in section, of this modification. Fig. 7 is a plan view of the hinged locking-beam.

Referring to the drawings, A represents the kneading-pan, which consists of an annular receptacle, open at the top and provided with a flaring rim, a. The interior walls of the receptacle rest against and are braced by an annular flange, B, having strengthening-wings b. These rest, together with the aforesaid kneading-pan A, upon a floor, C, also provided with suitable strengthening-pieces.

Centrally within and extending underneath the floor C is a rigid projection, D, the use of which will be hereinafter set forth.

This much of the apparatus is mounted or adapted to be mounted upon a truck, E, constructed as shown in Fig. 4, and provided with a central opening, e, through which the projection D is adapted to extend. The truck E is also provided with anti-friction rollers e″, which support the pan when it is resting on the truck, and which permit the pan to be easily turned by hand. The truck travels upon the tracks F.

Arranged upon both sides of and above and below the tracks F is the driving or operating mechanism, which I shall now proceed to describe.

G represents the bed-plate, upon which the tracks are laid, and upon which the standards H H′ are constructed. The standards H′ are provided with suitable journal-bearings h, in which rotates the driving or power shaft I. Upon the inner end of this shaft is placed a bevel-wheel, I′, which meshes with the larger bevel-wheel J, keyed to or formed in one with the shaft J′. Upon this latter shaft is placed a bevel-wheel, J″, which meshes with and rotates another wheel, K, upon the shaft K′, suitably disposed in journals k. The shaft K′ is also provided with a bevel-wheel, K″, for conveying power to the central shaft, L, through the bevel-wheel L′. The shaft L projects through the bottom of the hollow arm R, and is provided with an enlarged conical head, L''', and a circular flange, V, to be hereinafter more fully described. A short distance below the latter and upon the same shaft is a second wheel, L'', which meshes with the wheels M. These latter are placed upon the termini of the axles m, which operate the beaters or kneaders N. The preferred form of these beaters may be seen in Fig. 3, where two of them are shown; but I contemplate varying their shape and dimensions as occasion may demand, and also increasing their number, if necessary.

The straight portions n of the kneaders are adapted to scrape the interior walls of the kneading-pan, and these, together with the convex ends and the interior cut-away portions, form an arrangement which I have found by experiment to be best adapted to working the dough and keeping it at the same time from adhering to any extent to the pan itself. Upon the shafts m are placed clutching devices m', for throwing the kneaders in and out of connection with the driving mechanism. These clutches are operated by handles m''.

The shaft K' is provided at its further end with a third bevel-wheel, O, which meshes with the wheel O', keyed to the vertical shaft or spindle P. This shaft moves in suitable journal-bearings, and upon its lower end is placed the dough-stirrer Q. The wheel O is mounted loosely upon the shaft K', and is connected therewith for the purpose of imparting motion to the wheel O' by a sliding clutch, o, which may be of any suitable or known construction.

The beam R, which constitutes the bearing-frame for the above-described operating parts of the device, is hinged at Z to the standard H', and is adapted to be thrown back, using this point for a pivot. When, however, the frame is closed down and the various parts in operative position, it is firmly secured by means of the locking devices, shown on a larger scale in Fig. 2ª, said figure showing the parts before they are locked. This locking device consists of a spindle, s, having a handle, s', and provided with a spring, s'', resting on a shoulder immediately beneath it, and which is adapted to force the spindle upward when it is released. The spindle is further provided with lugs s''', which bear upon the under side of a screw-shaped ridge, s'''', upon the interior of the standard H. The standard H is hollow, and is provided with a rod, T, held in place by the annular flanges t of the standard H. The spindle s of the locking device rests upon the top of the rod T. This latter extends through the bottom of the standard H and rests upon the outer end of a centrally-pivoted lever, U. Upon the inner end of this lever is placed an upwardly-projecting post, U', which, extending through the bed-plate G, bears directly against the rigid projection D. The lever U is pivoted at u. A spring, u', serves to equalize the action of the same.

The flange V of the shaft L is provided with downwardly-projecting ribs v, and the base B is provided with similar upwardly-projecting ribs, v', which latter are represented partly in dotted and partly in full lines. When the part B and its accessories are raised, the ribs v and v' will intermesh with each other, so that motion imparted to the said shaft L will be transmitted to the pan.

The operation is as follows: The kneading-pan, when filled and placed upon the truck, is wheeled into position. The frame R is turned upon its pivot Z, and is lowered into place, the stirrers and kneaders falling into the kneading-pan, and the locking device S resting upon the standard H. The handle s' is then turned, and the spindle s, bearing against the rod T, presses it down, thereby depressing the lever U at its outer end and raising it at its inner end. As the post U' of the inner end of the lever rises it elevates the projection D, and consequently the pan itself; the wings v v', overlapping each other form a clutch mechanism, as above described. At the same time the apparatus has been locked, as the lugs of the spindle s have moved down under the spiral ridge s'''', whereby the frame R and the driving mechanism are held in place. It will be seen, then, that by a single movement— namely, the turning of the handle s'—the apparatus is locked, and the kneading-pan is elevated from the car and placed in operative position. The kneader may now be set to work, and when the dough has been brought to the desired consistency the above-described operation may be reversed, the apparatus unlocked, and the pan lowered upon the truck and wheeled away.

The modified form shown in Figs. 5, 6, and 7 represents a smaller apparatus adapted to be operated by hand.

The power-shaft W is provided with a small wheel, w, on its inner end, which meshes with a cog-wheel, W', having its teeth upon the inner periphery. The cog-wheel W' is keyed to a shaft, W'', which is provided with a bevel cog-wheel, W''', meshing with the larger wheel L', mounted on the main shaft L. The shaft W'' is also provided with a bevel-wheel, O, meshing with a similar wheel, O', which is mounted on the spindle P of the stirrer Q.

The frame R is pivoted at Z, and the locking and lifting mechanism is the same as in the larger apparatus.

Having thus described my invention, what I claim as new therein, and desire to secure by Letters Patent, is—

1. In a dough-kneading machine, the combination of a bed-plate having a pair of standards rising therefrom, a removable pan having a central pivot, a lever pivoted to the bed-plate, upon one end of which the pan's pivot bears, a frame hinged to one of said standards, a shaft rotating the pan carried by said frame, a hand-screw for locking the free end of said frame to the other standard above mentioned, and a rod passing through said standard and bearing upon the other end of the aforesaid lever, which is depressed by the hand-screw, in the manner and for the purposes set forth.

2. In a dough-kneading machine, the combination of the bed-plate G, having the standard H' rising therefrom, the frame R, hinged to said standard, the kneaders, and the shaft L, having the wings $v$, carried by said frame, with the centrally-pivoted pan A, having the wings $v'$, as and for the purpose set forth.

3. In combination, a bed-plate, a standard rising therefrom, a frame hinged to said standard, a rotating shaft carried by said frame, a removable pan having a central pivot projecting downwardly therefrom, and a truck having a central aperture for the passage of said pivot, and anti-friction rollers upon which the pan rests and is rotated by the shaft above mentioned, substantially as and for the purpose set forth.

4. A bed-plate, a standard rising therefrom, a frame hinged to said standard, and the kneaders, in combination with a removable pan having a central pivot projecting downwardly therefrom, a rotary shaft and connections with the movable parts, a truck having a central aperture for the passage of the pan's pivot, and a vertically-movable step upon which it rests, as and for the purpose set forth.

5. The combination of a bed-plate having a standard rising therefrom, a removable pan, a central pivot upon which said pan revolves, a frame hinged to said standard, the stirrers mounted in said frame, a shaft mounted vertically in said frame and having connections with the pan, the main shaft carried by said frame, and connections between said main shaft and the vertical shaft and stirrers, substantially as and for the purposes set forth.

6. In combination, a bed-plate, a standard rising therefrom, a frame hinged to said standard, a shaft mounted vertically in said frame, a pan having a central pivot, connections between said shaft and pan, a truck having a central aperture for the passage of said pivot, a step or bearing in said bed-plate, and a track or way, all constructed and arranged substantially as and for the purpose set forth.

7. In combination with a removable pan having a central pivot, a truck having anti-friction rollers upon its upper side, and a central aperture for the passage of the pan's pivot, and a vertically-movable step upon which said pivot rests, as and for the purposes set forth.

8. The combination, with the hinged frame R, having the beveled pinion J, kneaders, and connections between said pinion and kneaders, of the beveled pinion I', mounted upon an axis concentric with the hinge of the frame R, and gearing with the pinion J, as and for the purposes set forth.

9. The combination, with the bed-plate G, having standard H', and the removable pan A, having pivot D and wings $v'$, of the hinged frame R, carrying the main shaft K', and the shaft L, having wings $v$, intermeshing with the wings $v'$, substantially as and for the purposes set forth.

LOUIS DURAND.

Witnesses:
ROBERT DORNBURGH,
M. R. HACK.